United States Patent

[11] 3,558,824

[72] Inventors Akira Ogawa
Kawasaki-shi;
Takuro Muratani; Kunishi Nosaka, Tokyo-to, Japan
[21] Appl. No. 765,079
[22] Filed Oct. 4, 1968
[45] Patented Jan. 26, 1971
[73] Assignee Kokusai Denshin Denwa Kabushiki Kaisha
Tokyo-to, Japan
a joint-stock company of Japan
[32] Priority Oct. 6, 1967, Feb. 2, 1968
[33] Japan
[31] 42/64045 and 43/6053

[54] TIME-DIVISIONAL PHASE SYNCHRONIZING APPARATUS FOR A TIME-DIVISIONAL MULTIPLE SIGNAL OF BURST MODE
3 Claims, 6 Drawing Figs.

[52] U.S. Cl. .......... 179/15, 325/4
[51] Int. Cl. .......... H04j 3/06
[50] Field of Search .......... 179/15A, 15AB, 15Sync, 15APR; 325/4, 15SAT; 343/100SAT, 6.5, 7.5, 179

[56] References Cited
UNITED STATES PATENTS
3,349,398 10/1967 Werth .......... 343/100
3,430,237 2/1969 Allen .......... 343/7.5

*Primary Examiner*—Ralph D. Blakeslee
*Attorneys*—Robert E. Burns and Emmanuel J. Lobato

ABSTRACT: A time-divisional phase synchronizing apparatus is provided using a phase lock loop for a time-divisional multiple signal of burst mode including signals from a plurality of stations. A memory means is provided in the phase lock loop to separately store phase information of the signals of respective stations in each frame of the time-divisional multiple signal of burst mode, and a phase shifter is connected in the phase lock loop to time divisionally control the phase position of the output of an oscillator. The oscillator generates a stable frequency signal substantially equal to the frequency signal of the multiple signal in accordance with the contents of the memory means so that reference waves to be applied to detect the signals of respective stations can be derived from the phase lock loop.

TIME-DIVISIONAL PHASE SYNCHRONIZING APPARATUS FOR A TIME-DIVISIONAL MULTIPLE SIGNAL OF BURST MODE

This invention relates to a time divisional phase-synchronizing apparatus using a phase lock loop (hereinafter referred as PLL) for a time-divisional multiple signal of burst mode.

A wave having a reference phase (reference-phase wave) is necessary to carry out the synchronous detection of a phase-modulated wave, and this reference-phase wave is obtained by applying the phase-modulated wave to a generator of reference-phase wave. However, such a reference-phase wave as obtained in the above-mentioned manner generally includes noise and is not suitable for use in synchronous detection. In order to raise the signal to noise ratio of the reference-phase wave and to continuously maintain the stable phase position of the obtained reference-phase wave even if the reference phase cannot be sometimes detected from the phase-modulated wave, the PLL using a voltage controlled oscillator (hereinafter referred as VCO) has been heretofore employed.

In a satellite system by way of example, there is employed a time-divisional multiple signal of burst mode including, in one frame, a plurality of signals of respective stations which are respectively transmitted from a plurality of communication satellite earth stations and which have substantially the same frequency but have different phase positions from one another. In this case, there are heretofore adopted the following two methods to detect a plurality of reference waves each having a high signal to noise ratio from the time-divisional multiple signal.

In one of the two methods, the reference-phase waves for the signals of respective stations are obtained by synchronizing at each receiving of the signals of respective stations the phase of the VCO in the PLL to each phase position of the signals of respective stations. In other words, while the number of the PLL to be employed is one, it is necessary that the synchronization operation as mentioned above be performed over again for each of the signals of respective stations. In a case where the N number of earth stations carry out the multiple access to a space station, the reference phase is derived N-times during a time $T_f$ of one frame from the time-divisional multiple signal. Accordingly, if a time (T seconds) is necessary for each derivation of the reference phase, all the necessary time is a time NT seconds for the phase synchronization operation. Therefore, this method has such a disadvantage that messages can be transmitted at a rate of $(1 - NT/T_f)$ in the whole communication time.

In the other of the two methods, a plurality of PLL are provided for the signals of respective stations, and the outputs of the PLL are successively switched to every one of the signals of respective stations. In this method, since each of the signals of respective stations usually has a continuously stable phase position through successive frames, it is unnecessary that the synchronizing operation be performed over again at each receiving of the signal of respective stations if the PLL are respectively synchronized with the signals of respective stations. Moreover, a time necessary for compensating slight fluctuation of the phase position of each of the signals of respective stations become shorter. However, since a plurality of PLL using VCO are necessary to apply them to the signals of respective stations, the device for performing the synchronizing operation is considerably complicated.

An object of this invention is to provide a time-divisional phase-synchronizing apparatus for a time-divisional multiple signal of burst mode capable of performing the phase synchronizing operation in a short time without a plurality of PLL to generate time divisionally a plurality of reference-phase waves.

Another object of this invention is to provide a time-divisional multiple signal of burst mode capable of performing the phase synchronizing operation in a very short time in a precise manner without a plurality of PLL to generate time divisionally a plurality of reference-phase waves.

The principle of this invention will be better understood from the following more detailed discussion taken in conjunction with the accompanying drawings, in which the same or equivalent parts are designated by the same reference numerals, characters and symbols, and in which.

Figure 1:
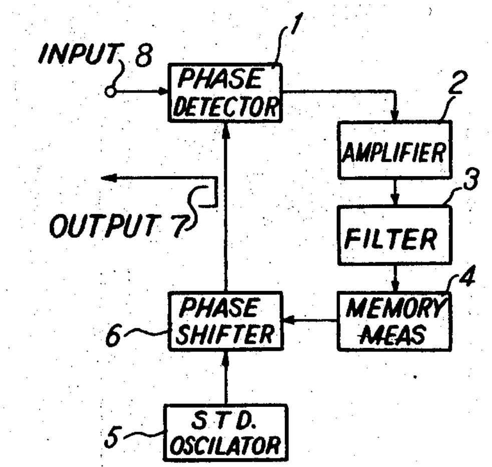
FIG. 1 is a block diagram for illustrating an embodiment of this invention.

An embodiment of FIG. 1 comprises a phase detector 1, an amplifier 2, a filter 3, a memory means 4 for storing phase information representative of every one of the signals of respective stations in a time-divisional multiple signal of burst mode applied from an input terminal 8 and for generating time divisionally signals representative of the stored phase information of the signals of respective stations. A standard oscillator 5 is provided for generating an output signal having a frequency substantially equal to the frequency of the time-divisional multiple signal of burst mode, a phase shifter 6 for controlling time divisionally the phase position of the output signal of the standard oscillator 5 by the use of the time-divisional outputs of the memory means 4, the input terminal 8, and an output means 7 for deriving an output signal having successively reference phase positions of the signals of respective stations.

The operation of this embodiment is as follows. If the time-divisional multiple signal of burst mode comprising the signals of respective stations A, B, C, ..... and N is applied to the phase detector 1 from the input terminal 8, the phase detector 1 produces time divisionally output voltages each corresponding respectively to differences between the respective phase positions of the time divisional outputs of the phase shifter 6 and the respective phase positions of the signals of stations A, B, C, ..... and N. In this case, the time-divisional output voltages of the detector 1 have the levels respectively proportional to the absolute values of the differences and have the polarities corresponding respectively to signs of the differences. The time-divisional output voltages of the detector 1 are amplified at the amplifier 2 and applied to the memory means 4 after eliminating high frequency components at the filter 3.

Figure 2:
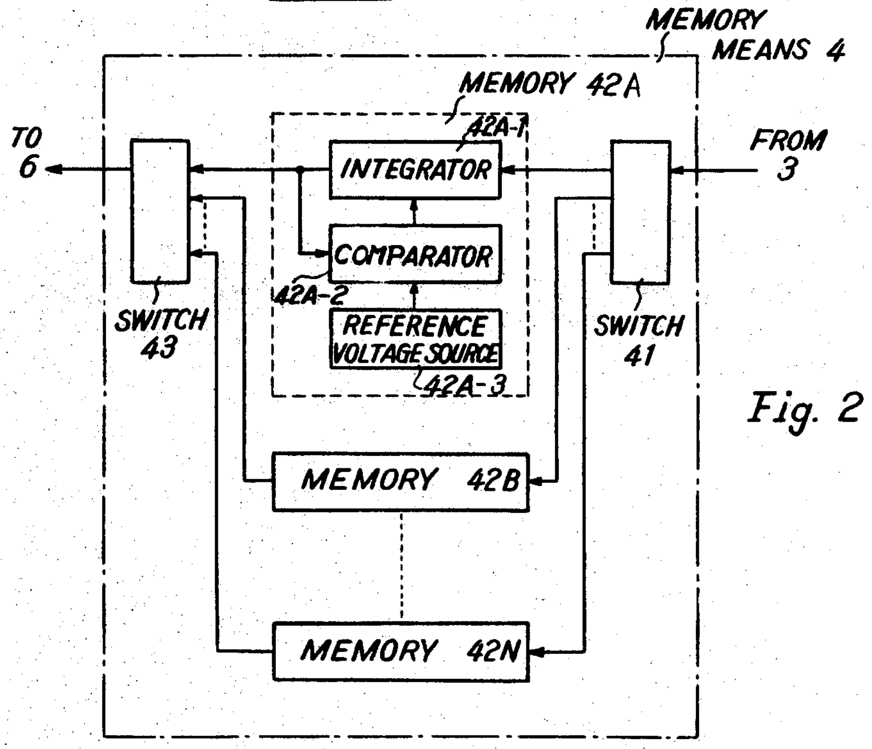
FIG. 2 is a block diagram for illustrating an example of memory means employed in the apparatus of this invention.

The memory means 4 has the characteristics and components as illustrated in FIG. 2 by way of example which comprises switches 41 and 43 and memories 42A, 42B, ..... and 42N. The switches 41 and 43 switch successively the memories 42A, 42B, ..... 42N, so as to connect them between the filter 3 and the phase shifter 6, in synchronism with the periods of the signals of respective stations A, B, C, ..... and N. The memories 42A, 42B, ..... and 42N correspond respectively to the signals of respective stations A, B, C, ..... and N.

The operation of the memory means 4 as to one frame is as follows: At first, the output of the detector 1 obtained in this frame from the signal of first station A is applied to an integrator 42A-1 of the memory 42A and integrated. The output voltage of this integrator 42A-1 is applied through the switch 43 to the phase shifter 6, so that the phase position of the output of the standard oscillator 5 is controlled at the phase shifter 6 so as to synchronize it to the phase position of the signal of station A which is applied to the phase detector 1 from the input terminal 8. If the signal of station A was terminated and the time has come when the signal of next station B will be received, the switches 41 and 43 switch the memory 42A to the memory 42B. Accordingly, the memory 42A is removed from the PLL but stores, as the phase information of the signal of station A, the voltage holding at the integrator 42A-1. In the succeeding periods, while the phase position of the output of the standard oscillator 5 is controlled time divisionally at the phase shifter 6 so as to synchronize successively with the phase positions of the signals of respective stations B, C, ..... and N, signals of the phase information representative of the phase positions of the signals of respective stations B, C, ..... and N are stored respectively into the respective memories 42B, 42C, ..... and 42N.

When the output of the detector 1 is obtained from the signal of station A in the next frame, the voltage held at the integrator 42A-1 in the just preceding frame is applied to the phase shifter 6 since the memory 42A stores the phase information of the signal of station A in the just preceding frame. Accordingly, if the phase position of the signal of station A in this frame is the same as the phase position of the signal of station A in the just preceding frame, the phase shifter 6 controls the phase position of the standard oscillator 5, by the use of the voltage applied from the integrator 42A-1 so as to synchronize it with the phase position of the signal of station A. Accordingly, the phase synchronizing can be performed instantaneously. Even if the phase position of station A in this frame is slightly different from the phase position of station B in the preceding frame, since the memory 42A stores the phase information of the signal of station A in the preceding frame and deviation of the phase position of the signal of station A from the preceding frame to this frame is usually very small, the time period necessary to carry out this synchronization operation is very short.

The above-mentioned operations are repeated for every one of the successive signals of respective stations B, C, ..... and N and moreover, for every one of the successive frames.

In the above-mentioned descriptions, it is assumed that the integrator 42A-1 of the memory 42A has an ideal characteristic. However, if step signals are successively applied to an actual integrator, the output voltage of this actual integrator cannot be increased without some limitation. A comparator 42A-2 and a reference voltage source 42A-3 are provided to operate the integrator 42A-1 as an ideal integrator. The reference voltage source 42A-3 produces a DC voltage corresponding to a phase shifting value $2n\pi$ (where $n$ is an integer 1, 2, 3, ..... or $n$) at the phase shifter 6. The comparator 42A-2 generates output signal to discharge the charged voltage of the integrator 42A-1 when the output voltage of the integrator 42A-1 reaches a voltage corresponding to the phase shifting value $2\ n\ \pi$. Even if this phase shifting of the value $2n\pi$ is carried out at the phase shifter 6, the phase position of the output of the phase shifter 6 is not noticeably changed. Moreover, since the output voltage of the integrator 42A-1 does not exceed the voltage corresponding to the phase shifting value $2n\pi$, it is sufficient that the phase shifter 6 has the maximum phase shifting value $2n\pi$.

Moreover, it is assumed in the above-mentioned descriptions that the standard oscillator 5 generates an output signal having a stable frequency substantially equal to the frequencies of the signals of respective stations A, B, C, ..... and N. However, if the frequency of the output of the standard oscillator 5 is different from the frequencies of the signals of respective stations A, B, C, ..... and N, this difference can be compensated for by inserting a storage capacity before the integrator 42A-1 which stores a voltage representative of the frequency of the signal of a station (e.g., station A).

The above-mentioned description relates mainly to derivation of reference-phase waves having a high signal to noise ratio from the input multiple signals. However, the apparatus of this invention can be applied to derive clock signals from the input multiple signal.

Figure 3:
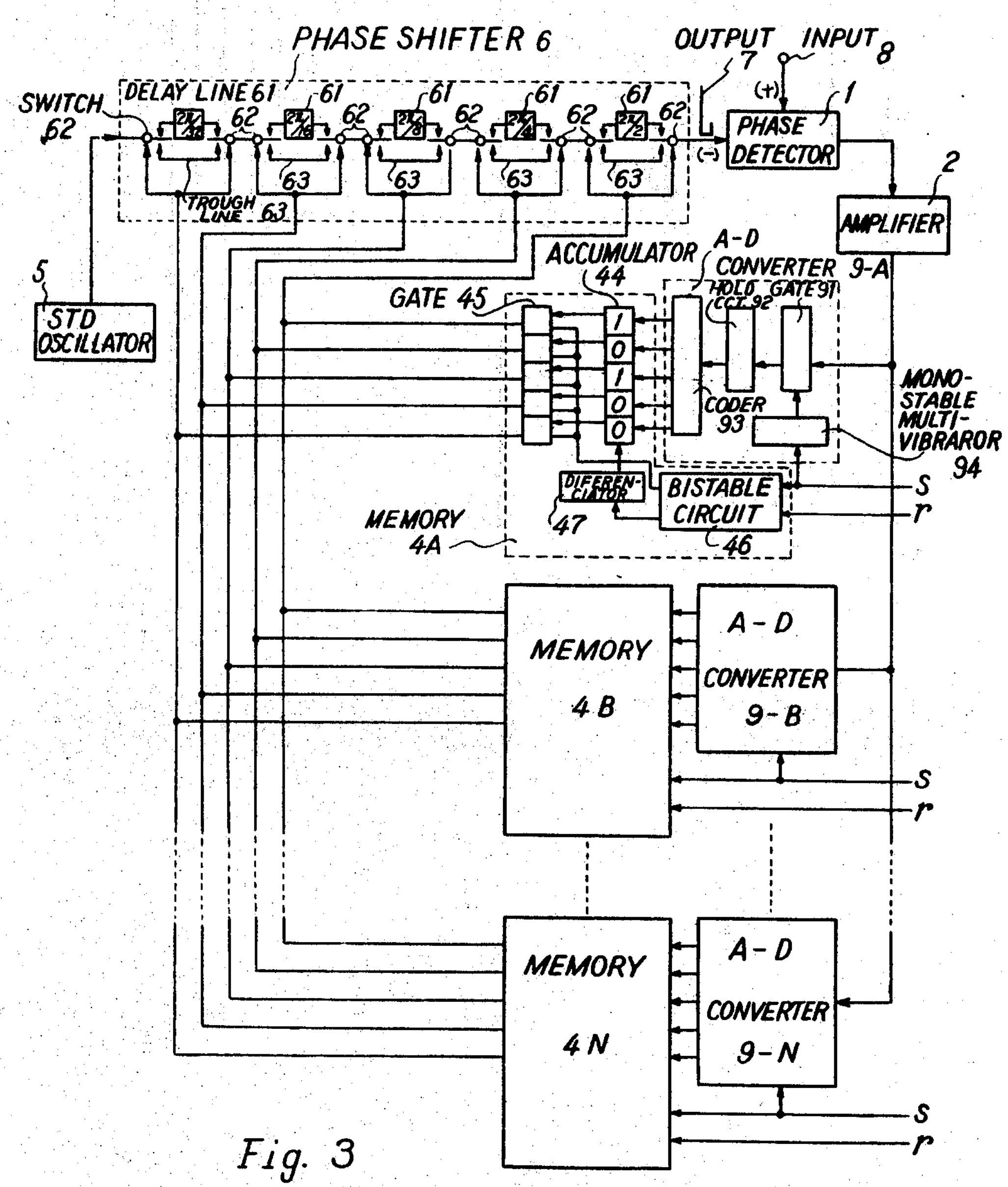
FIG. 3 is a block diagram for illustrating another embodiment of this invention.

With reference to FIG. 3, another embodiment of this invention will be described. To prevent unnecessary overlap of explanation, only parts different from those of the embodiment shown in FIG. 1 are described in detail. Memory means of this embodiment comprises a plurality of digital memories 4A, 4B, ..... and 4N. A plurality of analoque-to-digital (A-D) converters 9A, 9B, ..... and 9N are provided to convert the time divisionally produced analogue output signals of the amplifier 2 to a plurality of digital signals respectively applied to the digital memories 4A, 4B, ..... and 4N. The phase shifter 6 is also formed into a digital phase shifter.

The A-D converter (9A, 9B, ..... or 9N) is composed of binary five digits. A monostable multivibrator 94 is set by a set signal *s*, and an input gate 91 is opened at this set interval only of the multivibrator 94. A hold circuit 92 is composed of a storage capacitor, by way of example, and stores a voltage proportional to the average value of the output of the phase detector 1 during the interval when the input gate 91 is opened. A coder 93 converts the analogue voltage stored in the hold circuit 92 to digital signals to apply them to the memory (4A).

The memory (4A, 4B, ..... or 4N) comprises an accumulator 44, output gates 45, a bistable circuit 46 and a differentiator 47. The contents of the coder 93 are added to the contents of the accumulator 44. The accumulator 44 has a function for accumulating the phase position of the signal of each station by selecting one of 32 steps dividing a phase range 0 to $\pi$. If the contents of the accumulator 44 reach a value corresponding to the phase position $2\pi$, the contents of this accumulator 44 are reset to a value corresponding to the phase position 0. Accordingly, this accumulator 61 is an integrator having an infinite capacity of integration. The bistable circuit 46 is set and reset in response to a set signal *s* and a reset signal *r* respectively, and the output gates 45 are controlled by the use of the output of the bistable circuit 46. The differentiator 47 generates control pulses in response to transition instants from the set state to the reset state at the bistable circuit 46. This control pulses are applied to the accumulator 44, which adds its stored contents to the contents of the coder 93.

The phase shifter 6 comprises five steps each of which is composed of a delay line 61, a through line 62 and a pair of switches 63. The delay line 61 has delay times corresponding respectively to phase shifting values $2\pi/2$, $2\pi/4$, $2\pi/8$, $2\pi/16$ and $2\pi/32$. The switches 63 are controlled in accordance with the contents of the memory 4A, 4B, ..... or 4N. Accordingly, this phase shifter 6 controls the phase position of the output of the standard oscillator 5 so that one of a possible 32 steps dividing a phase range from 0 to $\pi$ radians is selected.

Figure 4:
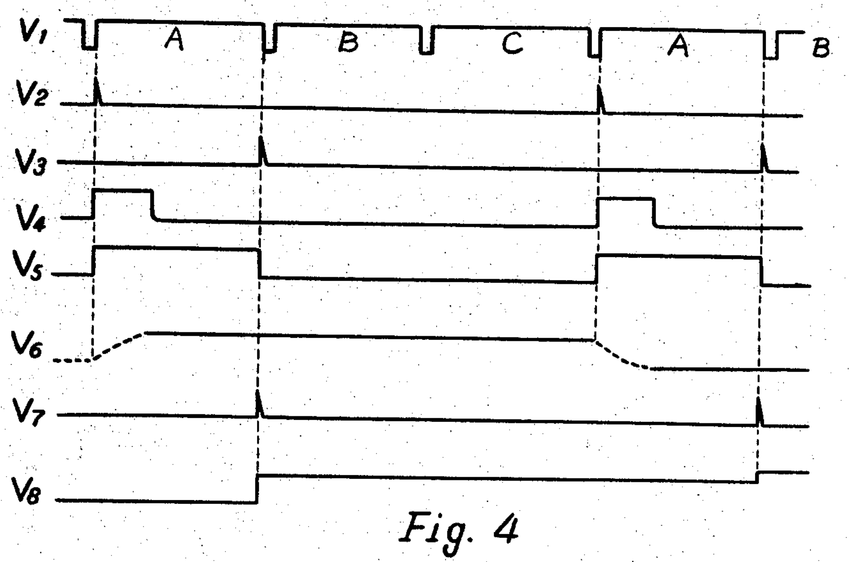
FIG. 4 shows time charts for describing the operation of the embodiment shown in FIG. 3.

The operation of the embodiment shown in FIG. 3 will be described with reference to FIG. 4 in which time charts are shown with respect to the signal of station A. A time-divisional multiple signal $V_1$ including signals of stations A, B and C is applied to the input of the phase detector 1. When the time signal of station A will be applied has come, the input gate 91 of the A-D converter 9-A and the output gates 45 of the memory 4-A are opened by respective gating pulses $V_4$ and $V_5$ generated in response to the set signal *s* ($V_2$). In the phase shifter 6, steps of phase shifting are selected in accordance with the stored contents (phase information) of the accumulator 44, so that the phase position of the output of the standard oscillator 5 is shifted by passing through the selected steps of the phase shifter 6. The phase comparison between the thus shifted signal and the signal of station A is carried out, and the phase detector 1 produces an output voltage corresponding to the phase difference between the compared two signals. This output voltage is amplified at the amplifier 2 and applied to the hold circuit 92 through the opened input gate 91. In the hold circuit 92, an average value ($V_6$) of the output voltage of the amplifier 2 during the opened period of the input gate 91 is stored until the input gate 91 is next opened as shown by "$V_8$." This stored voltage $V_6$ is coded at the coder 93 to a digital code representative of the phase information of the signal of station A. This digital code is added at the accumulator 44 to the previously accumulated contents of the accumulator 44, so that the result obtained from this add operation is employed to shift the phase position of the standard oscillator 5 at the next succeeding frame. The above-mentioned add operation starts from the termination time of the signal of station A by the use of the aforementioned control signal ($V_7$) from the differentiator 47.

The phase shifting information being the result obtained from the add operation at the accumulator 44 is applied to the switches 62 at the next succeeding frame when the output gates 45 are opened by the gating signal $V_5$ to select one of the possible 32 steps of phase shifting. In this case, if the phase position of the signal of station A applied from the input terminal is plus (+) and the phase position of the output of the phase shifter 6 is minus (−) as shown in FIG. 3, the delay line 61 or the through line 63 is selected in response to the contents 0 or 1 of the accumulator 44 respectively. If the contents of the accumulator 44 assume state "10100" as shown in FIG. 3 by way of example, three delay lines 61 respectively having delay times corresponding to respective phase shifting values $2\pi/4$, $2\pi/16$ and $2\pi/32$ are selected. Moreover, if the phase detector 1 produces an output corresponding to a phase difference + $2\pi/4$ at this time, a digital code "01000" representative of a phase shifting value $2\pi/4$ is added to the stored contents "10100" of the accumulator 44, so that the contents of the accumulator 44 is changed to state "11100." Accordingly, two delay lines 61 respectively having delay times corresponding to respective phase shifting values $2\pi/16$ and $2\pi/32$ are selected so as to advance, by a value $2\pi/4$, the phase position of the output of the phase shifter 6. As the result of this operation, the phase difference $+2\pi/4$ produced at the output of the phase detector 1 becomes zero.

The above-mentioned operations are performed with respect to each of the signals of respective stations A, B, ..... and N in a time-divisional manner controlled by the set pulse *s* and the reset pulse *r*. In other words, respective pairs (9-A, 4A), (9-B, 4B), ..... (9-N, 4N) of the A-D converter and the memory are controlled by respective pairs of the set and reset pulses which pairs are applied successively so as to synchronize with the start and termination of the signals of respective station A, B, ..... and N.

In the above-mentioned embodiment, the coder 93 is composed of binary five digits. However, this is not an essential condition, while the lowest digit must be representative of one step (e.g., $2\pi/32$ radians) of the phase shifting of the phase shifter 6. If it is allowable that a time necessary to carry out the initial phase synchronization is not so short, and if the frequency difference between the input multiple signal and the output of the standard oscillator 5 is negligible, the A-D converter and the memory may be simplified so as to carry out, during each frame, only one of the phase shifting steps. In this case, plus and minus threshold levels are provided to detect the deviation of the storage voltage in the hold circuit 92. Only when the storage voltage exceeds any of the threshold levels, the contents of the accumulator 44 are added or subtracted by 1 in accordance with the plus or minus deviation direction of the storage voltage. In this case, the coder 93 and the accumulator 44 can be replaced by a simple voltage comparator and a reversible counter respectively.

Figure 5:
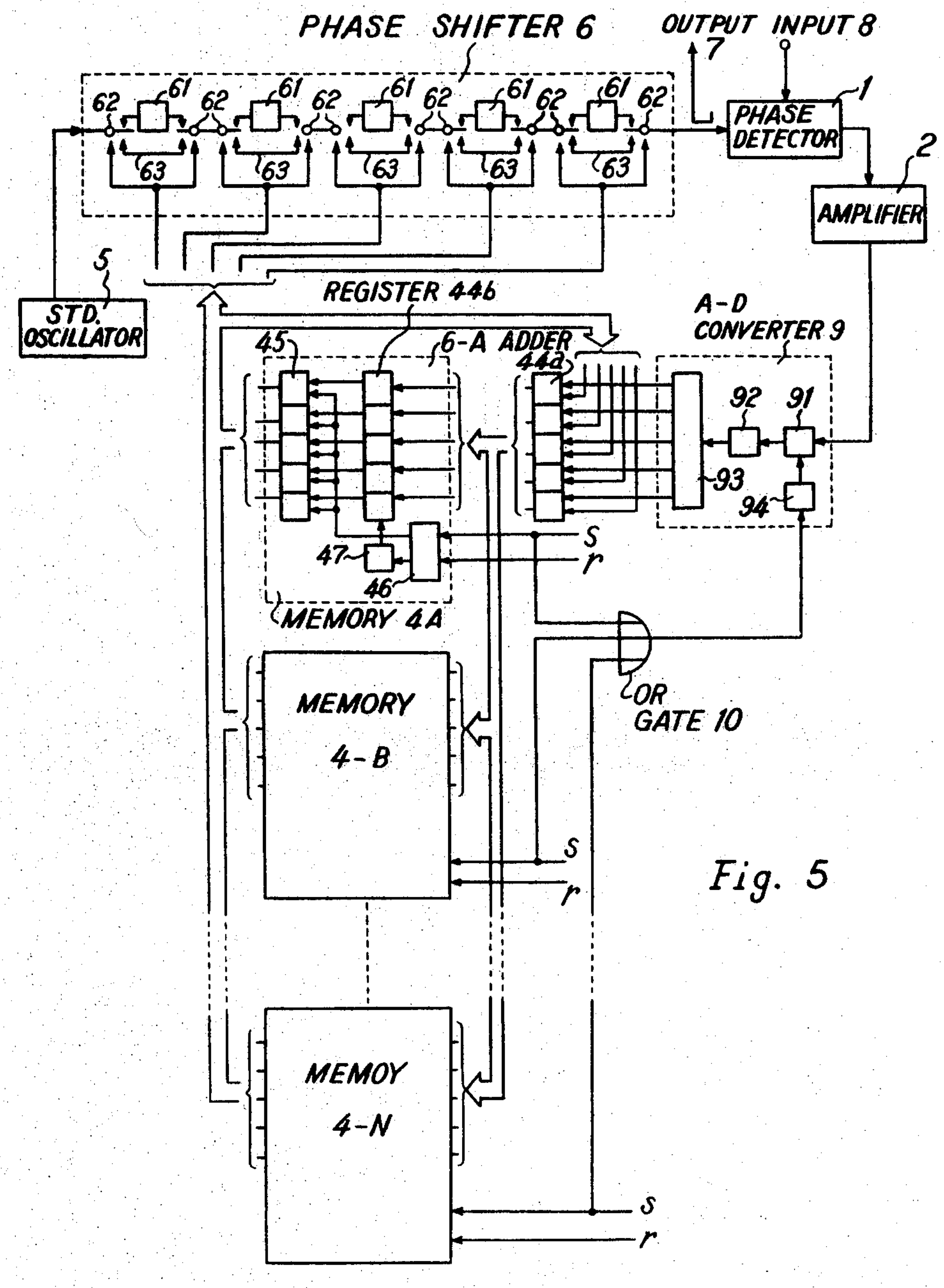
FIG. 5 is a block diagram for illustrating further embodiment of this invention.

In the above-mentioned embodiment, it is assumed that the A-D conversion and the accumulation are performed about one frame without the use of the high speed elements. However, if high speed elements are employed, the construction of the apparatus of this invention can be further simplified as shown in FIG. 5. In this embodiment, the accumulator 44 is divided into two circuits which are an adder **44*a* and a register 44*b*. Moreover, the A-D converter 9 and the adder 44*a* are commonly employed for the signals of respective station A, B, ..... and N, while the memories 4A, 4B, ..... and 4N each comprising the register 44*b*, the output gates 45, the bistable circuit 46 and the differentiator 47 are separately provided for the signals of respective stations A, B, ..... and N. The monostable multivibrator 94 controlling the input gate 91 is controlled by the output of an OR gate 10** to which set pulses *s* controlling the memories 4A, 4B, ..... 4N are applied as its input pulses.

Figure 6:
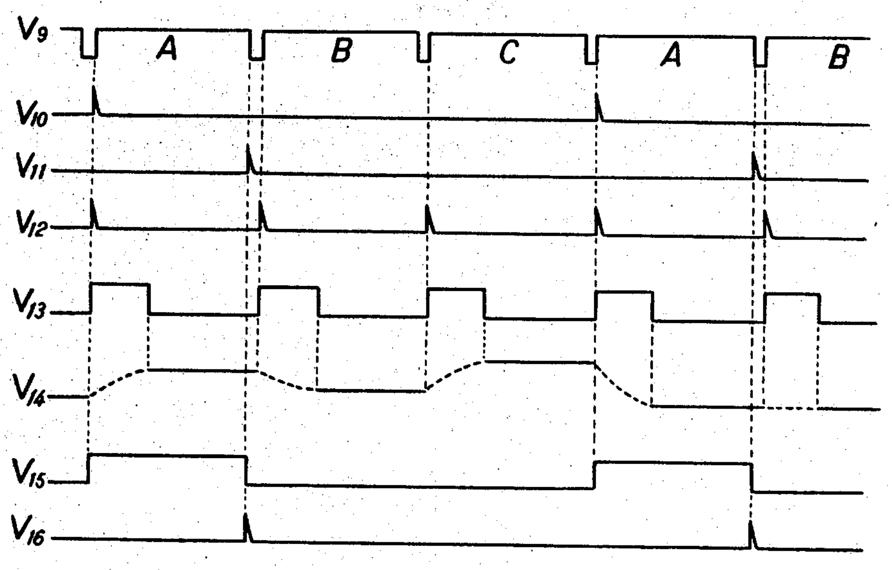
FIG. 6 shows time charts for describing the operation of the embodiment shown in FIG. 5.

The operation of the embodiment shown in FIG. 5 will be described with reference to time charts in FIG. 6. To prevent unnecessary overlap of explanation, only parts different from those of the embodiment shown in FIG. 3 are described in detail. While the accumulation operation in the embodiment shown in FIG. 3 starts at the termination of the signal of a station and is carried out until the top of the signal of a corresponding station in the next succeeding frame, the A-D conversion and the add operation are carried out until the termination of the signal of a station in the embodiment of FIG. 5 and the contents of the adder **44*a* are transferred into the register 44*b* by the use of a control pulse $V_{16}$. In this case, the write-in operation into the register 44*b* and the close operation of the output gates 45 are simultaneously performed. However, if it is desirable that these operations be more exactly carried out, the later operation is to be slightly delayed from the former operation. When the above-mentioned operations are performed, the A-D converter 9** is ready for performing the A-D conversion of the next signal of station.

We claim:

1. A time-divisional phase synchronizing apparatus for a time-divisional multiple signal of burst mode including signals of a plurality of stations, comprising:

a standard oscillator operative to generate a continuous wave having a stable frequency substantially equal to the frequency of the time-divisional multiple signal of burst mode;

a phase lock loop comprising a phase detector, memory means and a phase shifter;

input means for applying the time-divisional multiple signal of burst mode to the phase detector;

the phase shifter controlling time divisionally the phase position of the output of the standard oscillator in accordance with the contents of the memory means;

the phase detector producing time divisionally outputs having levels respectively proportional to the absolute values of differences between the respective phase positions of the time-divisional outputs of the phase shifter and the respective phase positions of the signals of stations and having the polarities corresponding respectively to signs of said differences;

the memory means storing separately, by the use of the time-divisional outputs of the phase detector, phase information of the signals of respective stations in each frame of the time-divisional multiple signal of burst mode; and output means coupled with the phase lock loop to derive time divisionally reference waves to be applied to detect the signals of respective stations.

2. An apparatus according to claim 1, in which the memory means comprises a plurality of memories each storing the time-divisional outputs of the phase detector as analogue information.

3. An apparatus according to claim 1, in which the memory means comprises a plurality of memories each storing the time-divisional outputs of the phase detector as digital information, and means for digitally controlling said phase shifter in accordance with said digital information.